United States Patent [19]

Peterson

[11] Patent Number: 4,593,887
[45] Date of Patent: Jun. 10, 1986

[54] CUTTING TORCH GUIDE
[76] Inventor: Carl Peterson, 7456 Main St., Niles, Ill. 60648
[21] Appl. No.: 744,531
[22] Filed: Jun. 14, 1985
[51] Int. Cl.⁴ .......................... B23K 7/04; B23K 7/10
[52] U.S. Cl. ...................................... 266/48; 266/54; 266/55; 266/58
[58] Field of Search ...................... 148/54, 55, 58, 48
[56] References Cited
U.S. PATENT DOCUMENTS
4,381,854  5/1983  Bruner ................................. 266/58

Primary Examiner—Wayland Stallard
Attorney, Agent, or Firm—Paul H. Gallagher

[57] ABSTRACT

A strip made up of a linear series of rigid links hinged together. Magnets are mounted on certain links, at spaced points, for holding the strip on the object to be cut by a torch. Spacers are located on the links on which the magnets are not mounted, holding those links in spaced relation from the object, even with the other links. All the links together define straight lines of their side edges.

12 Claims, 9 Drawing Figures

CUTTING TORCH GUIDE

FIELD OF THE INVENTION

The invention resides in the field of cutting torches and more particularly, guides for cutting torches, enabling the user to cut accurately along a predetermined line.

OBJECTS OF THE INVENTION

A broad object of the invention is to provide a guide for a cutting torch, having the following features and advantages:

1. It can be easily applied to the object to be cut.
2. It can be so applied quickly and without altering or modifying the object to which it is applied, and by merely setting it in place, the guide having magnets for holding it in position.
3. It can be used on objects of any of a wide variety and range of sizes and shapes, including round, angular, outside corners and inside corners, in horizontal position and vertical and overhead position, and on surfaces facing in any direction.
4. It readily conforms to and adheres to uneven surfaces.
5. It is of such character as to be of accurate shape regardless of its size, notwithstanding its articulate character which it assumes.

DESCRIPTION OF A PREFERRED EMBODIMENT

Referring to the invention in general, and as a matter of background, it has always been recognized that it is difficult to cut a straight line, with a cutting torch, in an object that is already in existence and in place and in use. This is in contrast to the use of cutting torches in producing new articles, or new shapes. In the latter situation, a guide or jig is set up to move the cutting torch along the desired line, which may be an outline shape, but the object to be cut is actually being formed, or produced, by that operation, and the form thus produced, is so produced as a result of setting up that guide or jig. However in the case where an object is already made, and in place, and in use, and it is desired to cut the object, the object is left in place and then selected means is utilized for producing the desired cut. Such instances may occur in the case of almost an endless variety of objects. For example it may be desired to cut a metal pipeline, or a tank, or virtually any kind of object. A specific item which it is often desired to cut is a corrugated retaining wall, commonly used in retaining a shore or bank at a waterline.

Heretofore a very common kind of operational step that was utilized, was drawing a straight line, as by snapping a line, and then moving the cutting torch along that line, usually without steadying means. In the case of a corrugated retaining wall, very often it is desired to cut the wall below the waterline which is done by a diver in the water. In many such cases it would virtually be impossible to see a line that was marked on such a retaining wall, because of the cloudiness of the water.

Figure 1:
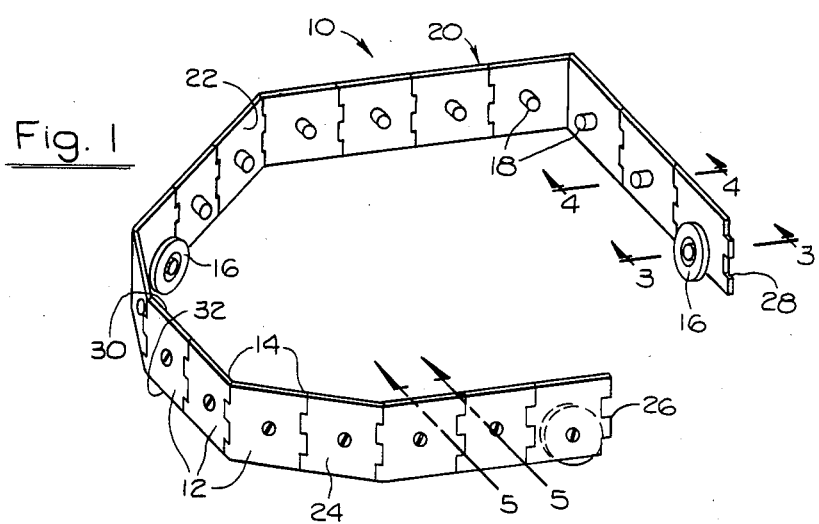
FIG. 1 is a perspective view of a cutting torch guide made according to the present invention.

Referring in detail to the accompanying drawings, attention is directed first to FIG. 1, showing in perspective view a cutting torch guide embodying the features of the present invention. The guide as a whole as indicated at 10 and is made up of a plurality of links 12, which may be identical, connected together in articulated form by hinge means 14 between adjacent links.

Mounted on certain ones of the links 12, at spaced apart positions, are holding magnets 16. On other ones of the links are spacers 18 of a depth, from the surface of the link, similar to that of the magnets 16.

The details of construction of the links, the hinge means, the magnets, and the spacers, will be referred to again in detail hereinbelow. For convenience in the description of the device, the guide includes a strip 20 made up of the links, the strip having an inner surface 22 on which the magnets and spacers are mounted, and an outer surface 24. Also, for convenience the ends of the strip 20 are identified 26, 28 respectively, for use in referring to the positioning of the guide on the objects to be cut. Additionally, the strip 20 has an upper side edge 30 and a lower side edge 32.

Figure 2:
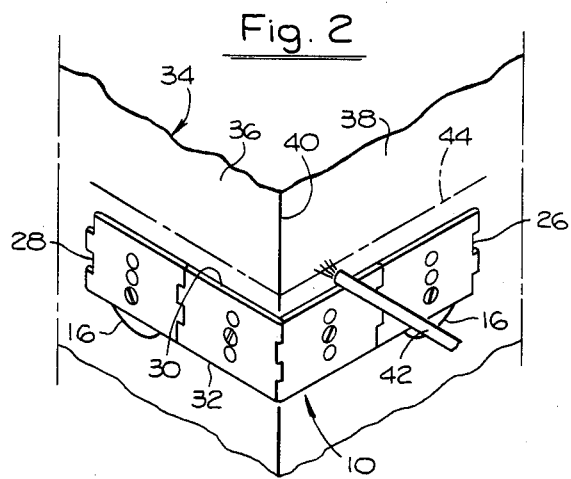
FIG. 2 is a fragmentary view of the guide applied to an object to be cut.

FIG. 2 shows in simplified form, an object 34 to be cut, having two side surfaces 36, 38 forming an outside corner 40. The object 34 is of magnetic material, to which the magnets adhere and thereby hold the guide in place. In the use of the device, it is applied to the object 34 with the magnets 16 facing the surfaces of the object, and put in place merely by setting it in the desired position, against the object, whereupon the magnets hold the guide on the object. In the position represented in FIG. 2, the strip is put in position with parts of the strip on each of the surfaces 36, 38, and thus extending around the outside corner 40. The upper edge surface 30 forms a straight line around the corner, and the cutting torch, here represented at 42, is applied to that upper edge, in position for cutting the object 34 along a line 44 following that edge 30. The operator then moves the cutting torch along the edge and cuts the object on that line.

Figure 3:
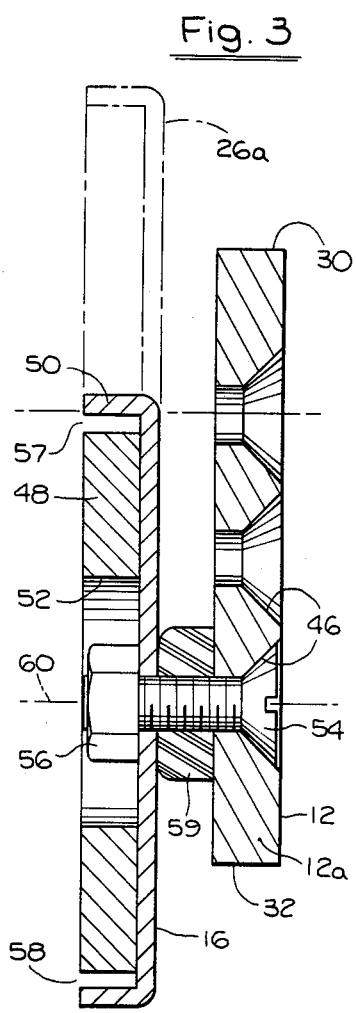
FIG. 3 is a large scale sectional view taken at line 3—3 of FIG. 1.

FIG. 3 is a large scale sectional view through the guide. A link 12, here individually identified 12a is shown, and the magnet 26. For mounting the magnet, and the spacers 18, each link is preferably provided with a plurality of screwholes 46, preferably three in number and arranged in a line in the direction of the width of the link. The magnet 26 itself may be of known kind, and in the present instance includes a magnet element 48 mounted in a cup 50. The magnet 48 may be annular in shape, having a central hole 52. A screwbolt 54 is fitted in one of the holes 46 and provided with a nut 56 positioned in the hole 52. The magnet 26 provides poles 57, 58 establishing the magnetic field for holding to the magnetic object 34. The magnets 16 are preferably mounted on the strip 20 in an arrangement providing limited universal movement. As shown in FIG. 3, resilient washers 59, which may be of rubber or rubberlike material, are interposed between the magnets and the surface of the link to enable the magnets to universally move, or wobble, around a central axis 60 which is perpendicular to the link. This universal movement enables the magnet to fit against irregular surfaces, or areas, on the object to which the device is applied, while positioning the links in a continuous end-to-end fashion.

The provision of the plurality of holes 46 enables the magnet to be placed at a selective position relative to the side edges of the strip 20. In the positioning shown, (FIGS. 1,3) the magnet is mounted in the bottom hole 46 so that the magnet extends below the edge surface 32, and the top edge surface 30 as shown in FIG. 2, is clear of any obstruction such as would otherwise interfere with movement of the cutting torch along that edge.

If the top cutting edge 30 should become deteriorated, and rough, the magnets 26 could be mounted in the upper hole 46, and the guide inverted, which would position them in an upper position, indicated at 26a in FIG. 3 and thus clear of the lower edge, which then would be the edge 30, and the other surface, 32, would be uppermost and that surface used as a guiding surface for the torch.

Figure 4:
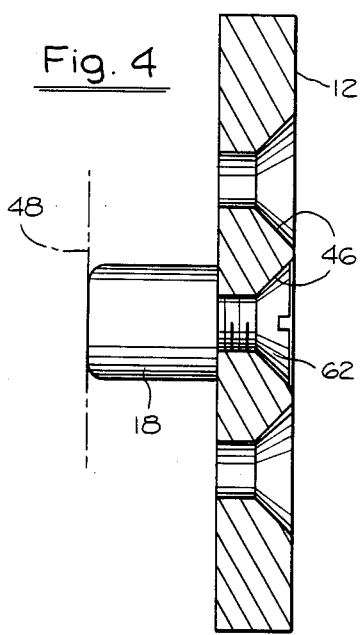
FIG. 4 is a large scale sectional view taken at line 4—4 of FIG. 1.
Figure 5:
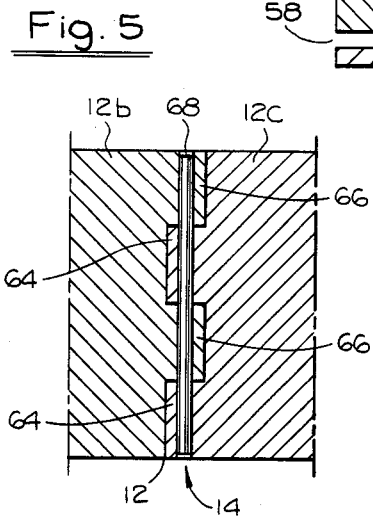
FIG. 5 is a large scale sectional view through a hinge means between adjacent links taken at line 5—5 of FIG. 1.

FIG. 4 shows the means for mounting a spacer 18. It is held in place by a screwbolt 62 in the center one of the three holes 46, and thus positioned in the middle of the link, in width direction. The spacer is of such length as to terminate substantially in the plane of the exposed surface of the magnet 48 so as to position the various links, between the magnets, at the same spacing as those links carrying the magnets.

The links 12 are of substantial dimensions for maintaining them in accurate interrelation to define accurate edge surfaces 30, 32. Preferably these links are of substantial thickness (FIG. 3) and the hinge means 14 includes a strong construction, such as the plurality of leaves 64, 66. In this figure two of the links 12 are shown, individually identified 12b, 12c. There are two leaves 64 integral with and extending from the leaf 12b, and two leaves 66 integral with and extending from the leaf 12c. These leaves are stacked or butted in tight engagement, and a pin 68 is fitted therethrough. These leaves form a solid continuation of metal throughout the width of the strip 20, i.e., along the length of the pin. In addition each leaf is of substantial width in that direction, and any tendency to bend or sag in direction about axes extending through the strip is resisted. As a consequence the edge surfaces 30, 32 are straight throughout the length of the strip. It is pointed out that in order to easily identify the condition of these surfaces, they are stated to lie in planes perpendicular to the axes of the pins 68, in all positions or attitudes of the links.

Figure 6:
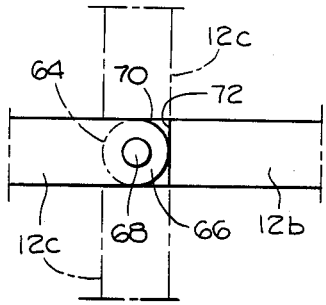
FIG. 6 is a fragmentary view taken from the top of FIG. 5.

The links 12 are also formed to enable a wide angular displacement between adjacent ones. FIG. 6 shows the links 12b, 12c. The uppermost leaf 66 is shown, and has a rounded edge surface 70 adjacent a surface 72 on the leaf 12b; the latter surface 72 may be straight. The arrangement shown enables adjacent links to be swung in relative angular position of up to approximately 180°, and it may be more.

Figure 7:
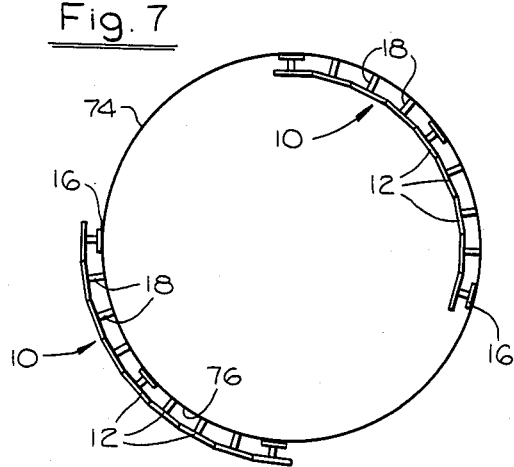
FIG. 7 is a semi-diagrammatic view of a circular object to be cut, showing guides applied thereto, one on the exterior convex surface and one on the interior concave surface.

FIG. 7 shows diagrammatically how the guide may be applied to a round object. In this figure the round object is represented by a tank 74, for example, and the guide 10 is applied to the outer surface as indicated at 76. This shows the magnets 16 engaging the surface of the tank. The links 12 are displaced only a relatively small angle, but the overall effect is to produce a shape that is close to circular, i.e., close to the shape of the tank.

FIG. 7 also shows the guide 10 applied to the inner surface, with the links following the inside curvature.

Figure 8:
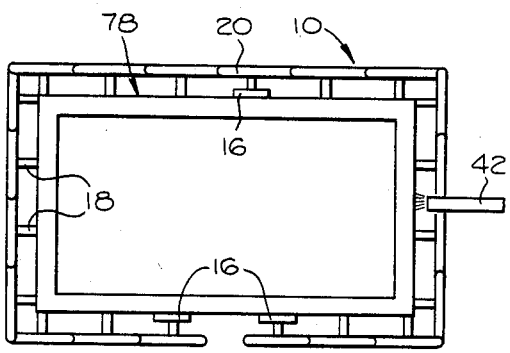
FIG. 8 is a semi-diagrammatic view showing a guide applied to a rectangular object.

FIG. 8 shows the guide applied to a rectangular object 78, and the strip 20 again shaped to correspond with the rectangular shape. In this case the cutting torch 42 is shown, engaging the upper edge surface of the guide, and showing the proximity relationship with the surface of the object to be cut.

Figure 9:
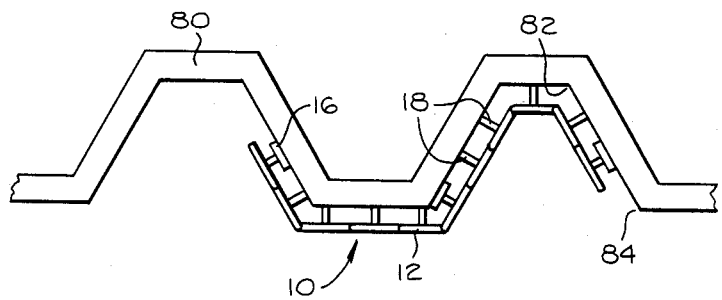
FIG. 9 is a semi-diagrammatic view of a guide applied to an object having both outside and inside angles.

FIG. 9 shows a corrugated retaining wall 80 of known kind, having both inside corners 82 and outside corners 84. The guide is applied to this shape in a similar manner, but flexed or bent in successively opposite directions to accommodate the inside and outside corners.

I claim:

1. A cutting torch guide comprising,
    a linear strip pivotable about first axes in the width direction, and distributed along the length of the strip,
    the strip being rigid in directions about second axes perpendicular to the first axes and to said width direction, and
    means for securing the strip to an object to be cut,
    the strip when applied to the object forming at least one edge defining a guide edge lying in a plane perpendicular to said first axes.

2. A cutting torch guide according to claim 1 wherein,
    the strip is made up of a plurality of links, each rigid in itself, and the links being pivotally secured together on respective ones of said first axes.

3. A cutting torch guide according to claim 2 for use in conjunction with objects of magnetic character, wherein,
    the securing means includes magnets engageable with the object and capable of magnetically holding the strip on the object.

4. A cutting torch guide according to claim 3 wherein,
    the magnets are provided on one side of the strip and on only spaced ones of the links with intermediate links therebetween, and
    the strip includes spacers on said intermediate links on the same side of the strip, extending in the same direction as that of the magnets, for spacing the intermediate links from the object similar to the spacing of the links on which the magnets are provided.

5. A cutting torch guide according to claim 3 wherein,
    the magnets are mounted for limited universal movement on the respective links operable for effectively engaging uneven surfaces on the object.

6. A cutting torch guide according to claim 3 and including,
    means for mounting each magnet selectively at different positions along a line extending in width direction and parallel with said first axes, whereby to enable the mounting of the magnets clear of a selected edge of the strip and maintain that edge clear enabling placing of a cutting torch on that edge and guidingly moving it along that edge the full length of the strip.

7. A cutting torch guide according to claim 4 and including, means for selectively mounting the magnets and spacers on any of the links, and each at selected positions on a link along a line extending in width direction and parallel with said first axes.

8. A cutting torch guide according to claim 2 wherein, the strip includes hinge means pivotally securing adjacent links together, each hinge means including a plurality of leaves forming integral extensions of the respective links, and a pin extending through the leaves in each hinge means, the leaves being of substantial length along said pin and the leaves being butted to each other and the leaves of each hinge means extending substantially the full width of the strip, and adjacent links being swingable through a wide angle, of at least 180°, relative to each other.

9. A cutting torch guide according to claim 3 wherein, the strip is made of non-magnetic material of any of the group containing wood, plastic, or metal.

10. A cutting torch guide for use with an object to be cut, comprising, a strip pivotable in each of opposite directions about predetermined parallel axes, and having a straight rigid edge lying in a plane perpendicular to said axes, and means for detachably mounting the strip on the object.

11. A cutting torch guide according to claim 10 wherein, the mounting means is operable for so mounting the strip independently of modification of the object.

12. A method of cutting an object along a predetermined line comprising, detachably mounting a guide on the object having an edge defining said line, and applying a cutting device to said edge and moving it therealong and simultaneously cutting the object along the line.

* * * * *